US010935463B2

(12) United States Patent
Lee

(10) Patent No.: US 10,935,463 B2
(45) Date of Patent: Mar. 2, 2021

(54) METHOD FOR DIAGNOSING DEVIATION OF AIR-FUEL RATIO BETWEEN CYLINDERS

(71) Applicants: Hyundai Motor Company, Seoul (KR); Kia Motors Corporation, Seoul (KR)

(72) Inventor: Dong-Hoon Lee, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 73 days.

(21) Appl. No.: 16/181,539

(22) Filed: Nov. 6, 2018

(65) Prior Publication Data

US 2019/0195736 A1 Jun. 27, 2019

(30) Foreign Application Priority Data

Dec. 27, 2017 (KR) ........................ 10-2017-0181251

(51) Int. Cl.
*G01M 15/11* (2006.01)
*F02D 41/00* (2006.01)
*F02D 41/14* (2006.01)

(52) U.S. Cl.
CPC .......... *G01M 15/11* (2013.01); *F02D 41/008* (2013.01); *F02D 41/0085* (2013.01); *F02D 41/1454* (2013.01); *F02D 41/1495* (2013.01); *F02D 2041/1432* (2013.01)

(58) Field of Classification Search
CPC ... G01M 15/11; G01M 15/04; F02D 41/0085; F02D 41/008; F02D 41/1454; F02D 41/1495; F02D 2041/1432; F02D 41/22; F02D 41/1498
See application file for complete search history.

(56) References Cited

U.S. PATENT DOCUMENTS

| | | | | |
|---|---|---|---|---|
| 6,314,952 B1* | 11/2001 | Turin | .................. | F02D 41/0085 123/673 |
| 6,382,198 B1* | 5/2002 | Smith | ................. | F02D 41/0085 123/673 |
| 7,802,563 B2* | 9/2010 | Behr | .................... | F02D 41/0082 123/692 |
| 7,900,615 B2* | 3/2011 | Wang | .................. | F02D 41/0085 123/672 |
| 8,261,727 B2* | 9/2012 | Bagnasco | ........... | F02D 41/1454 123/673 |
| 8,577,645 B2* | 11/2013 | Turin | .................. | F02D 41/0085 702/183 |
| 10,030,593 B2* | 7/2018 | Kappanganthu | .... | F02D 41/1439 |
| 10,094,311 B1* | 10/2018 | Lee | ...................... | F02D 41/2458 |
| 2010/0082297 A1* | 4/2010 | Turin | .................. | F02D 41/0085 702/183 |
| 2015/0345416 A1* | 12/2015 | Kappanganthu | .... | F02D 41/0087 123/673 |

(Continued)

*Primary Examiner* — Freddie Kirkland, III
(74) *Attorney, Agent, or Firm* — Morgan, Lewis & Bockius LLP

(57) ABSTRACT

A method for diagnosing deviation of an air-fuel ratio between cylinders using an oxygen sensor roughness, the method may include a diagnosis condition determination step, an oxygen sensor roughness determination activation step, an oxygen sensor roughness level determination step, an air-fuel ratio deviation detection step, and a failure reporting step.

18 Claims, 4 Drawing Sheets

(56) References Cited

U.S. PATENT DOCUMENTS

2016/0061131 A1\* 3/2016 Santillo .............. F01N 11/007
                                                                         60/285
2017/0089280 A1\* 3/2017 Santillo .................... F01N 3/08

\* cited by examiner

METHOD FOR DIAGNOSING DEVIATION OF AIR-FUEL RATIO BETWEEN CYLINDERS

CROSS-REFERENCE TO RELATED APPLICATIONS

The present application claims priority to Korean Patent Application No. 10-2017-0181251, filed on Dec. 27, 2017, the entire contents of which is incorporated herein for all purposes by this reference.

BACKGROUND OF THE INVENTION

Field of the Invention

The present invention relates to a method for diagnosing deviation of an air-fuel ratio of a gasoline engine, and more particularly, to a method for diagnosing deviation of an air-fuel ratio between cylinders using an oxygen sensor roughness.

Description of Related Art

To satisfy emission standards, a gasoline engine performs feedback control of a fuel injection rate so that combustion may be made in a theoretical air-fuel ratio ($\lambda=1$) region.

However, deviation of an air-fuel ratio between cylinders is caused by deviation of a filling amount of each cylinder and deviation of an injection rate due to failure of an injector in a mass-produced engine, and when a predetermined level or higher of deviation of an air-fuel ratio between cylinders occurs, operability deteriorates due to low combustion stability and an increase of exhaust gas is also largely affected.

A method for diagnosing deviation of an air-fuel ratio between cylinders according to the related art monitors an engine roughness determined using a change rate of an engine RPM while performing a fuel amount modulation in a lean direction for each cylinder. When performing a fuel amount modulation of in the lean direction for one cylinder, if non-uniformity in the engine RPM is generated due to a decrease in torque of the corresponding cylinder, a level of engine roughness is increased.

However, since a significant amount of fuel amount modulation (about 15% or more) in the lean direction is required to sufficiently sense a change in the level of engine roughness according to the related art, when diagnosing deviation of an air-fuel ratio between cylinders, loss of fuel efficiency is inevitable.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for diagnosing deviation of an air-fuel ratio between cylinders configured for decreasing a diagnosis time and loss of fuel efficiency by facilitating detection of the deviation of the air-fuel ratio through a small amount of fuel amount modulation in a lean direction using an oxygen sensor roughness sensitive to the deviation of an air-fuel ratio between cylinders instead of an engine roughness.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a method for diagnosing deviation of an air-fuel ratio between cylinders using an oxygen sensor roughness, the method may include: a diagnosis condition determination step, an oxygen sensor roughness determination activation step, an oxygen sensor roughness level determination step, an air-fuel ratio deviation detection step, and a failure reporting step.

In the diagnosis condition determination step, whether a diagnosis condition that an air-fuel ratio of an exhaust system reacts only by a fuel amount is satisfied may be determined to determine whether to perform the diagnosis.

When it is determined that the diagnosis condition is satisfied in the diagnosis condition determination step, the oxygen sensor roughness determination activation step may be performed to activate determination of the oxygen sensor roughness.

The oxygen sensor roughness may be determined as a difference between a maximum value and a minimum value detected every engine cycle for a difference value between a value of a signal of the oxygen sensor from which noise is removed by a low-pass filter and an average representative value of the air-fuel ratio determined through a moving average filter.

The oxygen sensor roughness may be determined as a root mean square error (RMSE) value detected every engine cycle for a difference value between a value of a signal of the oxygen sensor from which noise is removed by a low-pass filter and an average representative value of the air-fuel ratio determined through a moving average filter.

When the determination of the oxygen sensor roughness is activated in the oxygen sensor roughness determination activation step, the oxygen sensor roughness level determination step may be performed before performing the air-fuel ratio deviation detection step.

In the oxygen sensor roughness level determination step, when a level of the oxygen sensor roughness is a predetermined level or less in a predetermined engine operation region, the air-fuel ratio deviation detection step may not be performed, and it may be determined that there is no occurrence of deviation.

When it is determined that the level of the oxygen sensor roughness is the predetermined level or higher in the oxygen sensor roughness level determination step, the air-fuel ratio deviation detection step may be performed.

In the air-fuel ratio deviation detection step, the deviation of the air-fuel ratio between the cylinders may be detected by determining a change amount of the oxygen sensor roughness generated when performing a fuel amount modulation for each cylinder.

The air-fuel ratio deviation detection step may include a fuel amount modulation step, an oxygen sensor roughness change amount determination step, an oxygen sensor roughness change amount determination step, and a diagnosed cylinder switching step.

In the fuel amount modulation step, a fuel amount modulation in a lean direction may be performed for a current cylinder.

In the oxygen sensor roughness change amount determination step, a change amount of the oxygen sensor roughness changed by the fuel amount modulation in the lean direction may be determined.

In the oxygen sensor roughness change amount determination step, when the determined change rate of the oxygen sensor roughness with respect to an amount of fuel amount modulation is a predetermined threshold or more for a lean state or a predetermined threshold or less for a rich state, it may be determined that the corresponding cylinder causes the deviation of the air-fuel ratio between the cylinders to report a failure in the failure reporting step.

When it is determined that the current cylinder does not cause the deviation of the air-fuel ratio between the cylinders in the oxygen sensor roughness change amount determination step, in the diagnosed cylinder switching step, a diagnosed cylinder may be sequentially switched to the next cylinder according to a predetermined order, and the fuel amount modulation step may be performed for the next cylinder.

In the fuel amount modulation step, a fuel amount of other cylinders may be compensated in a rich direction to maintain the air-fuel ratio of the entire cylinders at a theoretical air-fuel ratio when performing the fuel amount modulation for the current cylinder in the lean direction.

In accordance with various exemplary embodiments of the present invention, there is provided a method for diagnosing deviation of an air-fuel ratio between cylinders using an oxygen sensor roughness, wherein the deviation of the air-fuel ration between the cylinders is diagnosed by a level of the oxygen sensor roughness in a predetermined engine operation region.

When the level of the oxygen sensor roughness in the predetermined engine operation region is a predetermined level or less, it may be diagnosed that the deviation of the air-fuel ratio between the cylinders does not occur.

In accordance with yet another exemplary embodiment of the present invention, there is provided a method for diagnosing deviation of an air-fuel ratio between cylinders using an oxygen sensor roughness, wherein the deviation of the air-fuel ration between the cylinders is diagnosed by a change amount of the oxygen sensor roughness generated when performing a fuel amount modulation in a lean direction for each cylinder.

When a change rate of the oxygen sensor roughness is a predetermined threshold for a lean state or more or a predetermined threshold for a rich state or less, it may be diagnosed that the deviation of the air-fuel ratio between the cylinders occurs by the corresponding cylinder.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
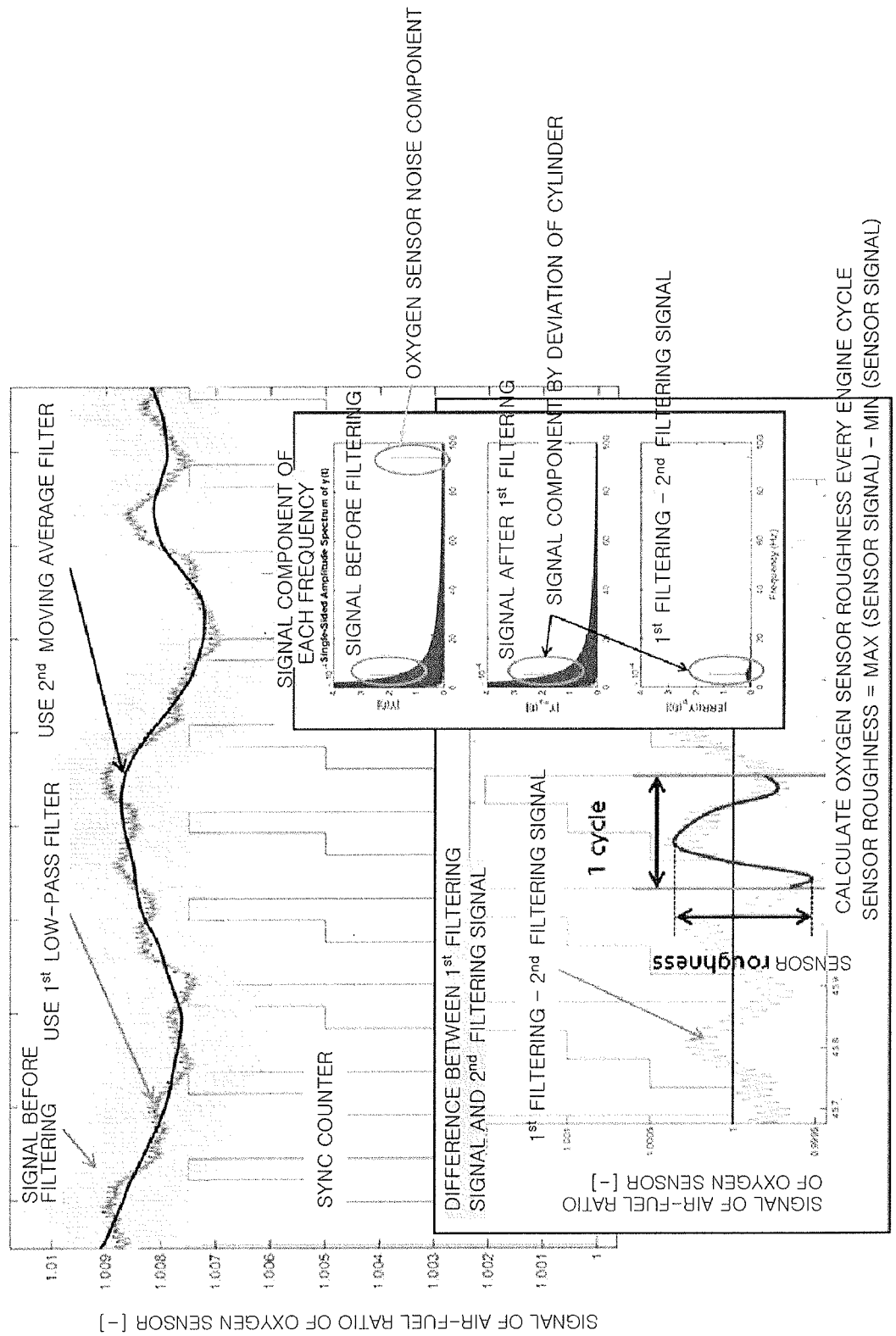
FIG. 1 is a view illustrating a process of determining an oxygen sensor roughness used in an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, a method for diagnosing deviation of an air-fuel ratio between cylinders according to an exemplary embodiment of the present invention will be described in detail with reference to the accompanying drawings. However, detailed descriptions related to well-known functions or configurations will be omitted in order not to unnecessarily obscure the gist of the present invention.

FIG. 1 is a view illustrating a process of determining an oxygen sensor roughness used in an exemplary embodiment of the present invention.

Referring to FIG. 1, an oxygen sensor roughness is determined as described below in the method for diagnosing deviation of an air-fuel ratio between cylinders according to an exemplary embodiment of the present invention.

First, noise of a signal of an oxygen sensor is removed by applying a low-pass filter to the signal of the oxygen sensor, an average representative value of an air-fuel ratio is determined through a moving average filter, and then a difference value between a value of the signal from which the noise is removed and the average representative value of the air-fuel ratio is determined.

When the difference value is determined, a maximum value and a minimum value for the determined difference value are detected every engine cycle to determine an oxygen sensor roughness defined as a difference between the maximum value and the minimum value that are detected.

Meanwhile, the oxygen sensor roughness may also be defined as a root mean square error (RMSE) value, rather than the difference between the maximum value and the minimum value described above, to be determined.

In the method for diagnosing deviation of an air-fuel ratio between cylinders according to an exemplary embodiment of the present invention, the deviation of the air-fuel ratio is diagnosed using a change amount of the oxygen sensor roughness generated when performing a fuel amount modulation for each cylinder.

Figure 2:
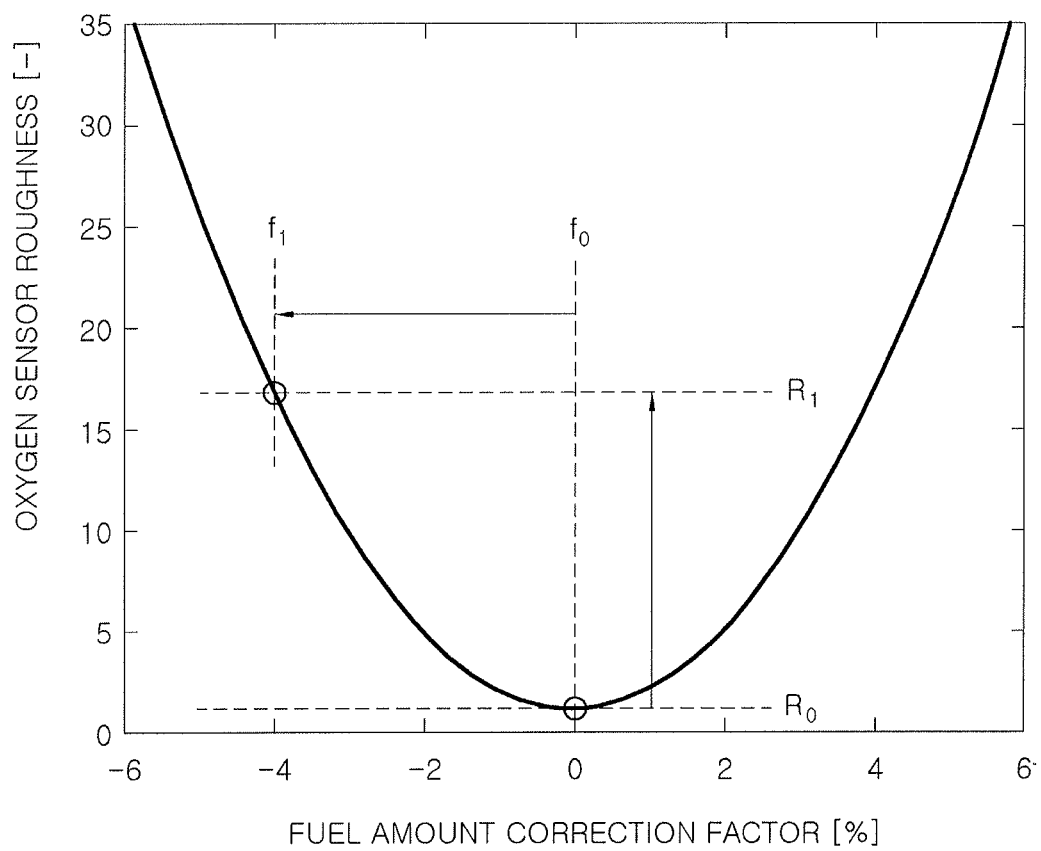
FIG. 2 is a view illustrating a change in an oxygen sensor roughness according to a modulation of a fuel amount in a lean direction in a method for diagnosing deviation of an air-fuel ratio between cylinders according to an exemplary embodiment of the present invention.

FIG. 2 is a view illustrating a change in an oxygen sensor roughness according to a modulation of a fuel amount in a lean direction in a method for diagnosing deviation of an air-fuel ratio between cylinders according to an exemplary embodiment of the present invention.

Referring to FIG. 2, in a case in which an air-fuel ratio of a specific cylinder deviates more as compared to other cylinders, when performing the fuel amount modulation ($f_0 \rightarrow f_1$) in a lean direction for each cylinder, a change amount ($\Delta R = R_1 - R_0$) of the oxygen sensor roughness is larger than that of other cylinders.

That is, in the case in which the air-fuel ratio of the specific cylinder deviates largely in the lean direction as compared to other cylinders, when performing the fuel amount modulation in the lean direction for the corresponding cylinder, the change amount of the oxygen sensor roughness tends to largely increase. On the other hand, in a case in which the air-fuel ratio of the specific cylinder deviates largely in a rich direction as compared to other cylinders, when performing the fuel amount modulation in the lean direction for the corresponding cylinder, the change amount of the oxygen sensor roughness tends to largely decrease.

Accordingly, in the method for diagnosing deviation of an air-fuel ratio between cylinders according to an exemplary embodiment of the present invention, when the fuel amount modulation in the lean direction is sequentially performed in a predetermined order, if the level of oxygen sensor roughness is increase to a predetermined threshold or more or a predetermined threshold or less, it is diagnosed that combustion in the corresponding cylinder is made in a relatively lean or rich state as compared to other cylinders, causing the deviation of the air-fuel ratio between the cylinders.

In a case in which a relationship between the fuel amount modulation and the oxygen sensor roughness for each cylinder is different depending on a shape of an exhaust system or a position of the oxygen sensor, a correction factor may be used for each cylinder so that the diagnosis may be performed in consideration of the characteristic described above.

Figure 3:
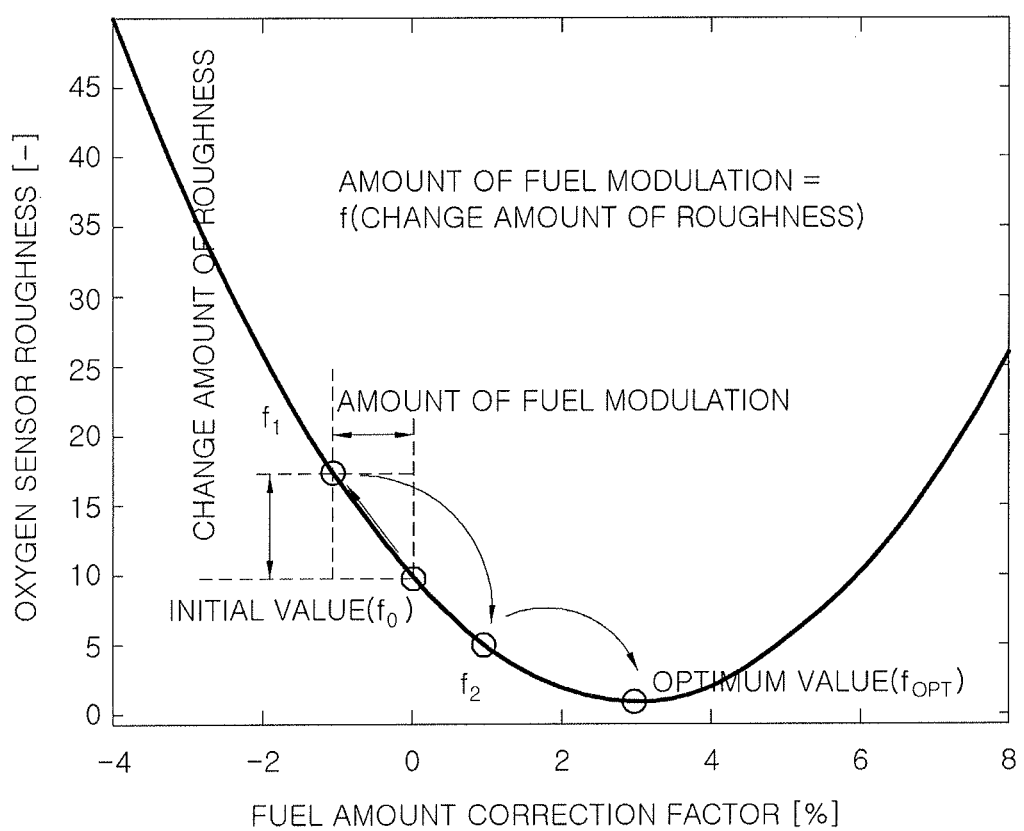
FIG. 3 is a view illustrating a method for diagnosing deviation of an air-fuel ratio between cylinders according to another exemplary embodiment of the present invention.

Meanwhile, as illustrated in FIG. 3, an optimum fuel amount correction factor may be determined using the fact that there is a functional relationship between an amount of fuel amount modulation and a change amount of the oxygen sensor roughness. At the instant time, when there is a predetermined level of difference between the determined optimum value and an initial value, it may also be diagnosed that the air-fuel ratio of the corresponding cylinder greatly deviates from the entire air-fuel ratio.

Figure 4:
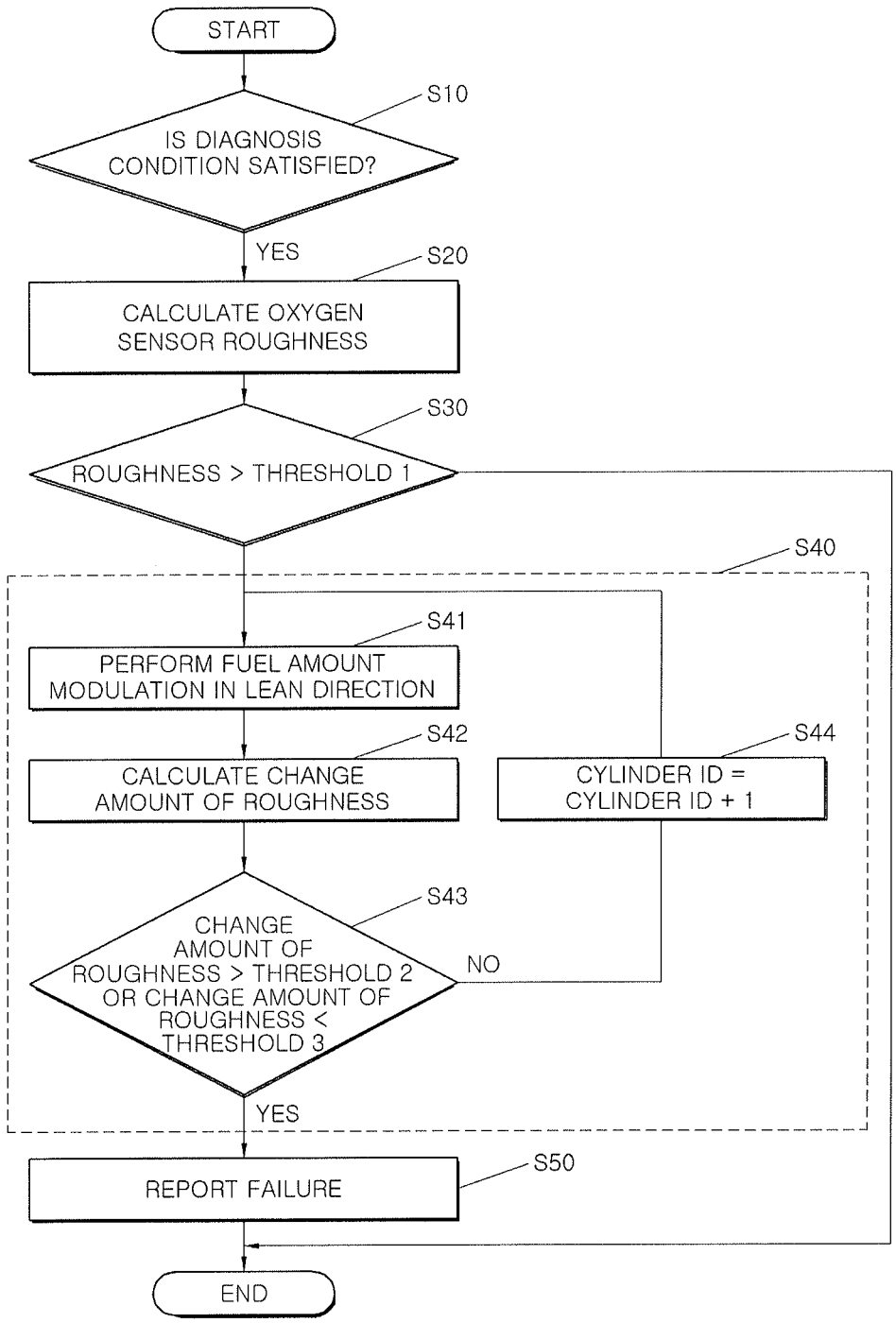
FIG. 4 is a flowchart illustrating steps of a method for diagnosing deviation of an air-fuel ratio between cylinders according to an exemplary embodiment of the present invention.

FIG. 4 is a flowchart illustrating steps of a method for diagnosing deviation of an air-fuel ratio between cylinders according to an exemplary embodiment of the present invention. In an exemplary embodiment of the present invention, the flowchart of FIG. 4 may be performed by a controller.

Referring to FIG. 4, the method for diagnosing deviation of an air-fuel ratio between cylinders according to an exemplary embodiment of the present invention includes a diagnosis condition determination step (S10), an oxygen sensor roughness determination activation step (S20), an oxygen sensor roughness level determination step (S30), an air-fuel ratio deviation detection step (S40), and a failure reporting step (S50) to diagnose deviation of an air-fuel ratio between cylinders using an oxygen sensor roughness.

The method for diagnosing deviation of an air-fuel ratio between cylinders according to an exemplary embodiment of the present invention is performed only when satisfying a condition that an air-fuel ratio of an exhaust system reacts only by a fuel amount during an operation of an engine.

To the present end, in the diagnosis condition determination step (S10), whether to perform the diagnosis is determined by determining conditions such as an activation of a signal of the oxygen sensor, air-fuel ratio feedback, occurrence of accidental fire, engine load and speed, an external environment such as an outdoor air temperature and an atmosphere pressure, a temperature of a coolant of an engine, a state of a fuel purge valve, a time elapsed after starting of the engine, and the like.

When it is determined that the diagnosis condition is satisfied in the diagnosis condition determination step (S10), the oxygen sensor roughness determination activation step (S20) is performed to activate the determination of the oxygen sensor roughness.

When the determination of the oxygen sensor roughness is activated in the oxygen sensor roughness determination activation step (S20), the oxygen sensor roughness level determination step (S30) is first performed before performing the air-fuel ratio deviation detection step (S40).

In the oxygen sensor roughness level determination step (S30), when the level of the oxygen sensor roughness is a predetermined level or lower in a predetermined engine operation region, the air-fuel ratio deviation detection step (S40) is not performed, and it is determined that there is no occurrence of deviation. Since the oxygen sensor roughness is affected only by the deviation of the air-fuel ratio between the cylinders, the determination of the occurrence of the deviation is possible only with the absolute level of the oxygen sensor roughness.

On the other hand, since the engine roughness used in the related art is affected by various factors such as shifting shock in addition to the deviation of the air-fuel ratio between the cylinders, the determination of the deviation of the air-fuel ratio between the cylinders is impossible only with the absolute level of the engine roughness.

According to an exemplary embodiment of the present invention, the oxygen sensor roughness level determination step (S30) is first performed before performing the air-fuel ratio deviation detection step (S40), minimizing an adverse effect on fuel efficiency and drivability caused by the diagnosis through frequent fuel amount modulations.

When it is determined that the level of the oxygen sensor roughness is a predetermined level or higher in the oxygen sensor roughness level determination step (S30), and it is thus suspected that deviation of an air-fuel ratio of a specific cylinder occurs, the air-fuel ratio deviation detection step (S40) is performed.

In the air-fuel ratio deviation detection step (S40), a change amount of the oxygen sensor roughness generated when performing the fuel amount modulation for each cylinder is determined to detect the deviation of the air-fuel ratio between the cylinders, and to the present end, the air-fuel ratio deviation detection step (S40) includes a fuel amount modulation step (S41), an oxygen sensor roughness change amount determination step (S42), an oxygen sensor roughness change amount determination step (S43), and a diagnosed cylinder switching step (S44).

In the fuel amount modulation step (S41), a fuel amount modulation in a lean direction for a current cylinder is performed, and in the oxygen sensor roughness change amount determination step (S42), a change amount of the oxygen sensor roughness changed by the fuel amount modulation is determined.

In the oxygen sensor roughness change amount determination step (S43), when a change rate of the oxygen sensor roughness with respect to a predetermined amount of fuel amount modulation is a predetermined threshold or more (lean state) or another threshold or less (rich), it is determined that the corresponding cylinder causes the deviation of the air-fuel ratio between the cylinders, reporting a failure in the failure reporting step (S50).

When it is determined that the current cylinder does not cause the deviation of the air-fuel ratio between the cylinders in the oxygen sensor roughness change amount determination step (S43), in the diagnosed cylinder switching step (S44), a diagnosed cylinder is sequentially switched to the next cylinder according to a predetermined order, and the fuel amount modulation step (S41) is performed for the next cylinder.

Meanwhile, in the fuel amount modulation step (S41), the fuel amount of other cylinders is compensated in the rich direction to maintain the air-fuel ratio of the entire cylinders at a theoretical air-fuel ratio when performing the fuel amount modulation in the lean direction thereof.

In accordance with the exemplary embodiments of the present invention, in the method for diagnosing deviation of an air-fuel ratio between cylinders, the diagnosis is performed using the oxygen sensor roughness, such that it is possible to perform the diagnosis using a small amount of fuel amount modulation as compared to the diagnosing method using an engine roughness, decreasing loss of fuel efficiency due to the diagnosis.

Furthermore, since rapid diagnosis on whether the deviation of an air-fuel ratio between cylinders occurs may be made based on the level of oxygen sensor roughness, an arbitrary fuel amount modulation is not performed in a normal engine, decreasing loss of fuel efficiency and exhaust gas emission.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for diagnosing a deviation of an air-fuel ratio between cylinders using an oxygen sensor roughness, the method comprising:
a diagnosis condition determination step of determining, by a controller, whether a diagnosis condition is satisfied;
an oxygen sensor roughness determination activation step of activating, by the controller, determination of the oxygen sensor roughness when the diagnosis condition is satisfied;
an oxygen sensor roughness level determination step of determining, by the controller, whether a level of the oxygen sensor roughness is greater than a first threshold value;
an air-fuel ratio deviation detection step of determining, by the controller, deviation of the air-fuel ratio when the level of the oxygen sensor roughness exceeds the first threshold value; and
a failure reporting step of reporting of a failure when a change amount of the oxygen sensor roughness with respect to a predetermined amount of fuel amount modulation is not within a range of a second threshold value,
wherein the oxygen sensor roughness level determination step is performed before performing the air-fuel ratio deviation detection step.

2. The method of claim 1, wherein in the diagnosis condition determination step, whether the diagnosis condition that the air-fuel ratio of an exhaust system reacts by a fuel amount is satisfied is determined by the controller to determine whether to perform the diagnosing of the deviation.

3. The method of claim 2, wherein the diagnosis condition includes one of an activation of a signal of an oxygen sensor, air-fuel ratio feedback, occurrence of accidental fire, engine load and speed, an external environment including an outdoor air temperature and an atmosphere pressure, a temperature of a coolant of an engine, a state of a fuel purge valve, and a time elapsed after starting of the engine.

4. The method of claim 3, wherein the oxygen sensor roughness is defined as a difference between a maximum value and a minimum value detected every engine cycle for a difference value between a value of a signal of the oxygen sensor from which noise is removed by a low-pass filter and an average representative value of the air-fuel ratio determined through a moving average filter.

5. The method of claim 3, wherein the oxygen sensor roughness is defined as a root mean square error (RMSE) value detected every engine cycle for a difference value between a value of a signal of the oxygen sensor from which noise is removed by a low-pass filter and an average representative value of the air-fuel ratio determined through a moving average filter.

6. The method of claim 1, wherein in the oxygen sensor roughness level determination step, when the level of the oxygen sensor roughness is a predetermined level or lower in a predetermined engine operation region, the air-fuel ratio deviation detection step is not performed, and it is determined that there is no occurrence of the deviation.

7. The method of claim 6, wherein, when it is determined that the level of the oxygen sensor roughness is the predetermined level or higher in the oxygen sensor roughness level determination step, the air-fuel ratio deviation detection step is performed.

8. The method of claim 1, wherein in the air-fuel ratio deviation detection step, the deviation of the air-fuel ratio between the cylinders is detected by determining the change amount of the oxygen sensor roughness generated when performing a fuel amount modulation for each of the cylinders.

9. The method of claim 8, wherein the air-fuel ratio deviation detection step includes a fuel amount modulation step, an oxygen sensor roughness change amount determination step, an oxygen sensor roughness change amount determination step, and a diagnosed cylinder switching step.

10. The method of claim 9, wherein in the fuel amount modulation step, a fuel amount modulation in a lean direction is performed for a current cylinder among the cylinders.

11. The method of claim 10, wherein in the oxygen sensor roughness change amount determination step, the change amount of the oxygen sensor roughness changed by the fuel amount modulation in the lean direction is determined.

12. The method of claim 11, wherein in the oxygen sensor roughness change amount determination step, when a determined change rate of the oxygen sensor roughness with respect to an amount of fuel amount modulation is a predetermined threshold for a lean state or more or a predetermined threshold for a rich state or less, it is determined that a corresponding cylinder among the cylinders causes the deviation of the air-fuel ratio between the cylinders to report the failure in the failure reporting step.

13. The method of claim 12, wherein, when it is determined that the current cylinder does not cause the deviation of the air-fuel ratio between the cylinders in the oxygen sensor roughness change amount determination step, in the diagnosed cylinder switching step, a diagnosed cylinder among the cylinders is sequentially switched to a next cylinder among the cylinders according to a predetermined order, and the fuel amount modulation step is performed for the next cylinder.

14. The method of claim 10, wherein in the fuel amount modulation step, a fuel amount of other cylinders among the cylinders is compensated in a rich direction to maintain the air-fuel ratio of all the cylinders at a theoretical air-fuel ratio when performing the fuel amount modulation for the current cylinder in the lean direction.

15. The method of claim 1, wherein the deviation of the air-fuel ratio between the cylinders is diagnosed by the level of the oxygen sensor roughness in a predetermined engine operation region.

16. The method of claim 15, wherein, when the level of the oxygen sensor roughness in the predetermined engine operation region is a predetermined level or less, it is diagnosed that the deviation of the air-fuel ratio between the cylinders does not occur.

17. The method of claim 1, wherein the deviation of the air-fuel ratio between the cylinders is diagnosed by the change amount of the oxygen sensor roughness generated when performing a fuel amount modulation in a lean direction for each of the cylinders,
wherein the level of the oxygen sensor roughness is determined before diagnosing the deviation of the air-fuel ratio.

18. The method of claim 17, wherein, when the change amount of the oxygen sensor roughness is a predetermined threshold for a lean state or more or a predetermined threshold for a rich state or less, it is diagnosed that the deviation of the air-fuel ratio between the cylinders occurs by a corresponding cylinder among the cylinders.

* * * * *